United States Patent Office 3,573,270
Patented Mar. 30, 1971

3,573,270
POLYMERIZATION OF ALPHA-OLEFINS USING A DELTA TiCl₃ CATALYST
Quirino Trementozzi, Springfield, Mass., Douglas O. Geymer, Orinda, Calif., Thomas Boyd, Des Peres, Mo., and Heinz J. Dietrich, Bethany, Conn., assignors to Monsanto Company, St. Louis, Mo.
No Drawing. Division of application Ser. No. 566,490, July 20, 1966, which is a continuation-in-part of application Ser. No. 143,300, Oct. 6, 1961, which in turn is a continuation-in-part of application Ser. No. 850,013, Nov. 2, 1959. This application July 26, 1968, Ser. No. 765,721
Int. Cl. C08f 1/42, 3/10, 7/04
U.S. Cl. 260—93.5                     11 Claims

ABSTRACT OF THE DISCLOSURE

Disclosed herein is a process for polymerizing an alpha-olefin in the presence of a catalyst system comprising the delta form of TiCl₃ and an organo metallic reducing agent.

---

This application is a divisional application of Ser. No. 566,490, filed July 20, 1966 which, in turn, is a continuation-in-part of our copending application Ser. No. 143,-300, filed Oct. 6, 1961, and now abandoned which in turn was a continuation-in-part of our then copending application Ser. No. 850,013, filed Nov. 2, 1959, and now abandoned.

The invention relates to a stereospecific polymerization of alpha-olefins and more particularly relates to a process for increasing the activity of $TiCl_3$-containing catalyst systems in the stereospecific polymerization of alpha-olefins.

It is known that stereoregulated polymers can be prepared by polymerizing alpha-olefins under relatively mild conditions of temperature and pressure in the presence of a catalyst system comprising $TiCl_3$ and an organometallic reducing agent, usually an aluminum alkyl compound. It is also known that the polymerization activity of the catalyst system in the early stages of polymerization can be increased by various methods of decreasing the particle size of the catalyst, e.g., by subjecting a dispersion of $TiCl_3$ in an inert liquid diluent to the action of ultrasonic vibrations or by ball milling $TiCl_3$ for about 40–70 hours in the presence of an aluminum alkyl compound an an inert diluent.

The polymerization activity of the catalyst can be increased as much as 100% by the latter method of decreasing its particle size. However, since (1) it is to be expected that a type of catalyst modification which would permit an increase in both the initial and the steady state rates of polymerization would be more effective than a type of catalyst modification which permits an increase in only the initial rate of polymerization and (2) reducing the particle size of the catalyst permits an increase in only the initial rate of polymerization, it would obviously be desirable to modify the catalyst in some manner different from or additional to particle size reduction in order to permit an increase in catalytic activity throughout the polymerization process.

An object of the invention is to provide a novel modified $TiCl_3$.

Another object is to provide a novel process for modifying $TiCl_3$.

Another object is to provide an improved process for the stereospecific polymerization of alpha-olefins.

Another object is to provide a process for increasing the activity of $TiCl_3$-containing catalyst systems in the stereospecific polymerization of alpha-olefins.

A further object is to provide a process for increasing this polymerization activity in such manner that both the initial and the steady state rates of polymerization are increased.

These and other objects are attained by treating either or both of the alpha- and gamma crystalline forms of $TiCl_3$ obtained either by hydrogen or aluminum reduction of $TiCl_4$ so as to change its crystal structure by impact grinding dry $TiCl_3$ particles at an impact frequency of at least 1800 impacts per minute. The treated $TiCl_3$, in lieu of untreated $TiCl_3$, can be used in conjunction with an organometallic reducing agent to form a catalyst system having increased activtiy in the stereospecific polymerization of alpha-olefins.

The following examples are given to illustrate the invention. In each of the processes described in the examples, it should be understood that precautions must be taken in choice of the apparatus, purification of the chemicals, and maintenance of an inert atmosphere to prevent contamination of the catalyst by moisture or oxygen. Parts mentioned in the examples are parts by weight. The cumulative polymerization rate constants, expressed as $K_{RC}$, are determined as follows:

$$K_{RC} = \frac{P}{C \times T \times PP}$$

where P represents the number of grains of polymer per liter, C represents the number of millimols of $TiCl_3$ per liter, T represents the polymerization time in hours, and PP represents the partial pressure of monomer in atmospheres.

EXAMPLE I.—CONTROL

A suitable reaction vessel is charged with a dispersion of 1 part of alpha-$TiCl_3$ (commercial product having an average particle size of about 2 microns in diameter) in 658 parts of n-hexane, followed by addition of a solution of 2.2 parts of $Al(C_2H_5)_3$ in 8 parts of n-hexane. The reaction vessel is placed in a constant temperature bath maintained at 50°±1° C., and propylene is charged to the vessel over a period of 15 hours so as to maintain a propylene partial pressure of 0.5 atmosphere. An inert atmosphere is maintained in the vessel throughout the reaction. After 15 hours the reaction is terminated by quenching with isopropanol. Ten minutes are allowed for the alcohol to react with the catalyst, and the slurry is then filtered to separate a precipitate which is reslurried with isopropanol, washed several times with methanol, and vacuum dried at 60° C. for 16 hours. Crystallizable polymer is isolated by hot heptane extraction of atactic polymer.

The reaction results in the formation of 26 parts of solid polypropylene having a viscosity average molecular weight of 417,000 and a number average molecular weight of 62,500. The crystallizable portion constitutes about 87.5% of the total polymer. The $K_{RC}$ is 0.53.

EXAMPLE II

One gram of dry particles of the alpha-$TiCl_3$ described in Example I is pretreated for 10 minutes in a dry, inert atmosphere by subjecting the particles to the high frequency impact of two steel balls having a diameter of ¼" in the cylinder (3 cc. capacity) of a "Wig-L-Bug," a vibratory grinder manufactured by the Crescent Dental Mfg. Co. and operated at 3150–3250 revolutions per minuter, to produce activated particles of less than 0.5 micron in diameter. X-ray analysis shows this pretreated alpha-$TiCl_3$ to be delta-$TiCl_3$.

Example I is then repeated with the exception that 1 part of this pretreated alpha-$TiCl_3$ is substituted for the 1 part of untreated alpha-$TiCl_3$. The reaction results in the formation of 126 parts of solid polypropylene having a viscosity average molecular weight of 246,000 and a number average molecular weight of 67,000. The crystallizable portion constitutes about 84% of the total polymer. The $K_{RC}$ is 2.58.

Use of 1 part of the pretreated alpha-TiCl₃ as a catalyst component is polymerization processes conducted under the same conditions as those outlined above, with the exception of variations in the polymerization time, results as follows:

| Polymerization time (hours): | $K_{RC}$ |
|---|---|
| 0.5 | 9.6 |
| 1 | 7.64 |
| 2 | 6.45 |
| 3.67 | 4.79 |
| 4 | 4.55 |
| 7.5 | 2.58 |
| 15.2 | 2.41 |
| 15.5 | 2.39 |
| 15.5 | 2.24 |
| 15.5 | 2.13 |
| 15.8 | 2.1 |

EXAMPLE III

One gram of dry particles of the alpha-TiCl₃ described in Example I is pretreated for 20 minutes in a dry, inert atmosphere by subjecting the particles to the high frequency impact of two steel balls having a diameter of ¼" in the cylinder (3 cc. capacity) of a "Wig-L-Bug" operated in 3150–3250 revolutions per minute. This pretreated alpha-TiCl₃ is delta-TiCl₃, as determined by X-ray analysis.

Example I is then repeated with the exception that 1 part of this pretreated alpha-TiCl₃ is substituted for the part of untreated alpha-TiCl₃. The reaction results in the formation of 168 parts of solid polypropylene, of which the heptane-insolubles constitute about 83.3%. The $K_{RC}$ is 3.44.

EXAMPLE IV

Five grams of dry particles of the alpha-TiCl₃ described in Example I are pretreated for 10 minutes in a dry, inert atmosphere to change the crystal structure to the delta form by subjecting the particles to the high frequency impact of three steel balls having a diameter of ⅝" in the cylinder (about 30 cc. capacity) of a "Wig-L-Bug" operated at 3450 revolutions per minute. Example I is then repeated with the following exceptions:

(1) 1 part of this pretreated alpha-TiCl₃ is substituted for the 1 part of untreated alpha-TiCl₃, and
(2) the polymerization time is 15.5 hours.

The reaction results in the formation of 200 parts of solid polypropylene, the crystallizable portion of which constitutes about 85%. The $K_{RC}$ is 3.93.

EXAMPLE V.—CONTROL

Example I is repeated with the following exceptions:

(1) the polymerization time is 6 hours, and
(2) for the 1 part of alpha-TiCl₃ is substituted 1 part of gamma-TiCl₃ prepared by reducing TiCl₄ with Al(CH₃)₃, subsequently decomposing the resultant CH₃TiCl₃ in an inert hydrocarbon diluent, and then heating the substantially pure gamma TiCl₃ thus formed at 250–300° C. for 2–3 hours.

The reaction results in the formation of 50 parts of solid polypropylene, of which the heptane-insolubles constitute about 80.6%. The $K_{RC}$ is 2.54.

EXAMPLE VI

Two grams of dry particles of the gamma-TiCl₃ described in Example V are pretreated for 10 minutes in a dry, inert atmosphere by subjecting the particles to the high frequency impact of three steel balls having a diameter of ⅝" in the cylinder (about 30 cc. capacity) of a "Wig-L-Bug" operated at 3450 revolutions per minute to convert the gamma-TiCl₃ to delta-TiCl₃.

Example V is then repeated with the exception that 1 part of this pretreated gamma-TiCl₃ is substituted for the 1 part of untreated gamma-TiCl₃. The reaction results in the formation of 96 parts of solid polypropylene, of which the heptane-insolubles constitute about 76.5%. The $K_{RC}$ is 4.95.

EXAMPLE VII.—CONTROL

A suitable reaction vessel containing a dispersion of 1 part of alpha-TiCl₃ (a commercial product obtained by the hydrogen-reduction of TiCl₄) and 2.2 parts of Al(C₂H₅)₃ in about 149 parts of n-heptane is placed in a constant temperature bath maintained at 70° C. Propylene is charged to the vessel over a period of 2 hours so as to maintain a propylene partial pressure of 0.6 atmosphere. After 2 hours the reaction is terminated by quenching with isopropanol. Ten minutes are allowed for the alcohol to react with the catalyst, and the slurry is then filtered to separate a precipitate which is reslurried with isopropanol, washed several times with methanol, and vacuum dried at 60° C. for 16 hours. The reaction results in the formation of about 0.16 part of solid polypropylene. The $K_{RC}$ is 0.20.

EXAMPLE VIII

A dispersion in 30 ml. of heptane of 0.116 gram of the alpha-TiCl₃ described in Example VII is charged to a vessel having a one-inch diameter. A piezo-electric transducer is attached to the vessel and operated for two minutes at a frequency of 24,000 cycles/second and a power input of 10–15 watts/cm.². This pretreated alpha-TiCl₃ has a reduced particle size, as evidenced by the greater stability of the dispersion. X-ray analysis shows that the pretreated alpha-TiCl₃ is still the alpha-form.

Example VII is then repeated with the exception that 1 part of this pretreated alpha-TiCl₃ is substituted for the 1 part of untreated alpha-TiCl₃. The reaction results in the formation of about 0.40 part of solid polypropylene. The $K_{RC}$ is 0.52.

EXAMPLE IX

Two and one-half grams of dry particles of the alpha-TiCl₃ described in Example VII are pretreated for 20 minutes in a dry, inert atmosphere by subjecting the particles to the high frequency impact of three steel balls having a diameter of ⅝" in the cylinder (about 30 cc. capacity) of a "Wig-L-Bug" operated at a 3450 revolutions per minute. This pretreated alpha-TiCl₃ is shown to be delta-TiCl₃ by X-ray analysis.

Example VII is then repeated with the exception that 1 part of this pretreated alpha-TiCl₃ is substituted for the 1 part of untreated alpha TiCl₃. The reaction results in the formation of about 10 parts of solid polypropylene. The $K_{RC}$ is 13.33.

The invention is a process for increasing the activity of TiCl₃-containing catalyst systems in the stereospecific polymerization of alpha-olefins by pretreating the TiCl₃ component of the catalyst so as to change its crystal structure. It is applicable to the treatment of TiCl₃ in two of its previously-known crystalline forms, i.e., alpha-or gamma-TiCl₃, regardless of the technique used to prepare the TiCl₃ being treated such as hydrogen or aluminum reduction of TiCl₄. Thus, e.g., the TiCl₃ can be substantially pure TiCl₃, TiCl₃ containing AlCl₃ in solid solution, etc.

The pretreatment is a modification of TiCl₃ by high frequency impact grinding of dry TiCl₃ particles, the frequency of impact being at least 1800, preferably at least 8000, impacts per minute. The grinding medium can be any material capable of exerting a grinding force against the TiCl₃ particles under high frequency impact conditions, steel balls and rods being particularly suitable. Any device capable of causing a grinding force to impinge the TiCl₃ particles at high frequently can be used to accomplish this pretreatment, particularly suitable devices being the "Wig-L-Bug" mentioned in the working amples, other high speed vibratory grinders, hammer and impact mills, and the like. As will be obvious to those skilled in the art, the time required to effect the desired modification of $TiCl_3$ is dependent on the nature of the device used to accomplish the pretreatment, the density and configuration of the grinding medium, the frequency of impact, the crystalline form of $TiCl_3$ being treated, and other variables. When the variables are adjusted to give energy conditions comparable to those shown in the working examples, the pretreatment of $TiCl_3$ is usually continued for about 3 to 20 minutes.

The pretreatment results in changing the crystal structure of $TiCl_3$ and usually (at least when the material being treated has a particle size of greater than 1 micron in diameter) also results in reducing its particle size. Because of the change in crystal structure resulting from this pretreatment, the consequent increase in the polymerization activity of $TiCl_3$-containing catalyst systems is greater than would be proportional to the increase in surface area of $TiCl_3$ particles.

High frequency impact grinding of dry $TiCl_3$ in accordance with the present invention leads to the formation of a new crystalline form of $TiCl_3$: delta-$TiCl_3$. A discussion of the crystal structure of delta-$TiCl_3$ can be found in G. Natta et al., "The Different Crystalline Modifications of $TiCl_3$, a Catalyst Component for the Polymerization of Alpha-Olefins," Journal of Polymer Science, vol. 51, pp. 399–410 (1961). This crystalline form of $TiCl_3$ is a more active cataylst component than any of the three previously known crystalline forms and is characterized in the Natta reference as follows:

"The powder spectrum of delta-$TiCl_3$ shows some sharp lines together with some diffuse reflections of halos. The number of sharp lines appears to be remarkably lower than those detectable in the corresponding spectra of the alpha- and gamma-modifications. The corresponding reflections, on the basis of a hexagonal unit cell having the same dimensions of those of alpha- and gamma-$TiCl_3$ (i.e., $a=b\cong6.13$ A., $c\cong17.40$ A.) possess Bragg indexes satisfying the relationships $h=3m$, $k=3n$, $l=3p$ ($m$, $n$, $p$=integer numbers).

Reflections of this type are the only ones that appear in both the alpha- and gamma-modifications with the same indexes and intensity, suggesting that the structure of the delta-modifications is in some way similar to the alpha- and gamma-structures. Clearly, the presence of halos in addition to the above-mentioned reflections indicates some type of disorder in the layer structures. Two halos are more characteristic and intense (data recorded on most of the examined samples). One has a maximum at 2 theta=17.2° ($CuK\alpha$) $d$=5.13 A.), halo concentrated toward the lowest 2 theta values, strong. A second halo has a maximum at 2 theta=33.8° ($CuK\alpha$) ($d$=2.65 A.), symmetrical, very strong.

The first halo appears with similar shape and intensity in the spectra of the alpha- and sometimes of the gamma-modification. A distribution of x-ray intensity lying in this 2 theta region must be due to diffraction by the titanium atoms alone. In alpha-$TiCl_3$, it has been indeed explained by Reed and MacWood as originated from $10l$ ($l$ continuous and small) streaks, owing to disorder in the succession of titanium atoms layers. As the intensity in reciprocal space may be approximately assumed to be uniformly distributed along the ($10l$) zone ($l$ continuous) and the difference in Bragg angles (theta ($10l$)-theta (100)) tends to zero $l^2$, for $l$ small, the shape of the halo must be disymmetric in respect to its maximum, ending very sharply toward the low (2 theta) angles, and being more and more diffuse at high angles.

The halo at 2 theta=33.8° ($d$=2.65 A.) is much stronger and characteristic than the 17.2° halo, since it lies intermediate between the sharp lines at 2 theta=32.9° ($d$=2.72 A.) and 2 theta=35.6° ($d$=2.52 A.) which are typical for the alpha-modification (reflection with (113) and (113) indexes) and for the gamma-form (reflection with (114) indexes), respectively, and it appears to substitute them in the new form."

Pretreatment of dry $TiCl_3$ in accordance with this invention results in increasing the activity of $TiCl_3$-containing catalyst systems in the stereo-specific polymerization of alpha-olefins. This application of $TiCl_3$ is too well known to require detailed description, but it may be described briefly as the formation of stereoregulated polymers by polymerizing one or more alpha-olefins, e.g., alpha-olefins containing 2–8 carbon atoms, such as ethylene, propylene, butene-1, etc., aryl olefins such as styrene, etc., under relatively mild conditions of temperature and pressure, e.g., at 20–200° C. under pressures not exceeding 200 p.s.i., usually at 50–90° C. under pressures of 15–1000 p.s.i., in the presence of a catalyst system comprising a dispersion in an inert hydrocarbon diluent of $TiCl_3$ and an organo-metallic reducing agent, e.g., a zinc alkyl compounds, an antimony alkyl compound, a beryllium alkyl compound, or preferably a compound corresponding to the formula $AlRR'R''$, wherein R represents an alkyl radical, R' and R'' represent an alkyl radical or halogen, and R, R', and R'' may represent the same or different substituents attached to Al. The catalyst composition can include optional addends such as alcohols, amines, organic acids, chlorinated organic compounds, simple inorganic salts, organic-metallic compounds of metals of Groups II and III or the Periodic Table, etc.

Use in these catalyst compositions of the dry-ground $TiCl_3$ of the invention in lieu of $TiCl_3$ which has not been treated by the process of the invention is particularly advantageous in that it results in increasing both the initial polymerization rate and the steady state polymerization rate, thus increasing the polymer yield. It has additional advantage over the use of the untreated $TiCl_3$ in that it causes a narrowing of the molecular weight distribution of the polymers formed.

It is obvious that many variations may be made in the products and processes set forth above without departing from the spirit and scope of this invention.

What is claimed is:
1. In a process for polymerizing monomers selected from the group consisting of aryl olefins and aliphatic alpha-olefins of from 2 to 8 carbon atoms using a catalyst system comprising an organometallic reducing agent and a dispersion of titanium trichloride in an inert hydrocarbon diluent, wherein the organometallic reducing agent is an aluminum alkyl compound corresponding to the formula $AlRR'R''$, wherein R is an alkyl radical, R' and R'' are selected from the group consisting of alkyl radicals and halogens, the improvement which comprises using the delta form of titanium trichloride as the titanium trichloride component of the catalyst wherein the delta titanium trichloride is further characterized by having a powder spectrum with a halo having a maximum at 2 theta=17.2° ($CuK\alpha$)($d$=5.13 A.) and another halo having a maximum at 2 theta=33.8° ($CuK\alpha$)($d$=2.65 A.).

2. A process as in claim 1 wherein the organometallic reducing agent is $Al(C_2H_5)_3$.

3. A process as in claim 1 wherein the alpha-olefin is propylene.

4. A process as in claim 1 wherein the alpha-olefin is ethylene.

5. A process as in claim 1 wherein the aryl-olefin is styrene.

6. In a process for polymerizing monomers selected from the group consisting of styrene and alpha-olefins of from 2 to 8 carbon atoms using a catalyst system comprising an organometallic reducing agent and a dispersion of titanium trichloride in an inert hydrocarbon diluent, wherein the organometallic reducing agent is an aluminum alkyl compound corresponding to the formula $AlRR'R''$, wherein R is an alkyl radical and R' and R'' are selected from the group consisting of alkyl radicals and halogens, the improvement which comprises using the delta form of titanium trichloride as the titanium trichloride component of the catalyst system wherein the delta titanium trichloride is further characterized by having a powder spectrum with a halo having a maximum at 2 theta=17.2° (CuKα) (d=5.13 A.) and another halo having a maximum at 2 theta=33.8° (CuKα) (d=2.65 A.).

7. A process as in claim 6 wherein the organometallic reducing agent is $Al(C_2H_5)_3$.

8. A process as in claim 6 wherein the alpha-olefin is propylene.

9. A process as in claim 6 wherein the alpha-olefin is ethylene.

10. In a process for polymerizing propylene using a catalyst system comprising an organometallic reducing agent and a dispersion of titanium trichloride in an inert hydrocarbon diluent, wherein the organometallic reducing agent is an aluminum compound corresponding to the formula AlRR'R", wherein R is an alkyl radical, R' and R" are selected from the group consisting of alkyl radicals and halogens, the improvement which comprises using the delta form of titanium trichloride as the titanium trichloride component of the catalyst wherein the delta titanium trichloride is further characterized by having a powder spectrum with a halo having a maximum at 2 theta=17.2° (CuKα)(d=5.13 A.) and another halo having a maximum at 2 theta=33.8° CuKα)(d=2.65 A.).

11. A process as in claim 10 wherein the organometallic reducing agent is $Al(C_2H_5)_3$.

References Cited

UNITED STATES PATENTS

| | | | |
|---|---|---|---|
| 3,134,642 | 5/1964 | Mertes | 23—87 |
| 3,482,935 | 12/1869 | Trementozzi et al. | 23—87 |

OTHER REFERENCES

La Chimica & l'Industria, November 1960, vol. 42, No. 11, pp. 1207, 1212–1215, 1224 and 1225.

Journal of Polymer Science, vol. 51, pp. 387–398 (1961), article by Natta et al.

Journal of Polymer Science, vol. 51, pp. 399–405 (1961), article by Natta et al.

JAMES A. SEIDLECK, Primary Examiner

U.S. Cl. X.R.

260—88.2, 93.7, 94.9

PO-1050
(5/69)

UNITED STATES PATENT OFFICE
CERTIFICATE OF CORRECTION

Patent No. 3,573,270      Dated March 30, 1971

Inventor(s) Quirino A. Trementozzi, Douglas O. Geymer, Thomad Boyd & Heinz J. Dietrich It is certified that error appears in the above-identified patent and that said Letters Patent are hereby corrected as shown below:

Column 6, line 10, before "alpha-olefins" insert - - - aliphatic - - -.

Column 6, line 15, "15-1000" should read - - - 15-100 - - -.

Signed and sealed this 24th day of August 1971.

(SEAL)
Attest:

EDWARD M. FLETCHER, JR.
Attesting Officer

WILLIAM E. SCHUYLER, JR.
Commissioner of Patents